(12) United States Patent
Longacre

(10) Patent No.: US 9,043,002 B2
(45) Date of Patent: May 26, 2015

(54) ADAPTIVE CONTROL OF ELECTRICAL DEVICES TO ACHIEVE DESIRED POWER USE CHARACTERISTICS

(75) Inventor: James B Longacre, Thornton, CO (US)

(73) Assignee: Myoonet, Inc., Seattle, WA (US)

( * ) Notice: Subject to any disclaimer, the term of this patent is extended or adjusted under 35 U.S.C. 154(b) by 215 days.

(21) Appl. No.: 13/362,223

(22) Filed: Jan. 31, 2012

(65) Prior Publication Data

US 2012/0194146 A1 Aug. 2, 2012

Related U.S. Application Data

(60) Provisional application No. 61/437,799, filed on Jan. 31, 2011.

(51) Int. Cl.
  *G06F 19/00* (2011.01)
  *G06F 1/26* (2006.01)
  *G06F 1/32* (2006.01)

(52) U.S. Cl.
  CPC .............. *G06F 1/266* (2013.01); *G06F 1/3203* (2013.01); *G06F 1/3234* (2013.01)

(58) Field of Classification Search
  CPC .... G06F 1/3209; G06F 1/3234; G06F 1/3203
  USPC .......................................................... 700/22
  See application file for complete search history.

(56) References Cited

U.S. PATENT DOCUMENTS

| 4,163,194 A * | 7/1979 | Ross ........................ 324/761.01 |
| 2004/0201279 A1* | 10/2004 | Templeton ....................... 307/11 |
| 2006/0022852 A1* | 2/2006 | Leung et al. ..................... 341/51 |
| 2006/0025892 A1* | 2/2006 | Leung et al. ................... 700/293 |
| 2006/0033650 A1* | 2/2006 | Leung et al. ................... 341/143 |
| 2007/0143046 A1* | 6/2007 | Budike, Jr. ...................... 702/62 |
| 2007/0239477 A1* | 10/2007 | Budike, Jr. .......................... 705/1 |
| 2008/0046388 A1* | 2/2008 | Budike, Jr. ..................... 705/412 |
| 2011/0173109 A1* | 7/2011 | Synesiou et al. ................ 705/34 |
| 2012/0194146 A1* | 8/2012 | Longacre ...................... 323/234 |
| 2012/0271475 A1* | 10/2012 | Wang et al. ................... 700/295 |

OTHER PUBLICATIONS

Maksimovic, Dragan, Regan Zane, and Robert Erickson. "Impact of digital control in power electronics." Power Semiconductor Devices and ICs, 2004. Proceedings. ISPSD'04. The 16th International Symposium on. IEEE, 2004.*

Lee et al, "Simple Digital-Controlled AC/DC Converter with Power Factor Correction for Universal Input Applications", IEEE 2007.*

* cited by examiner

*Primary Examiner* — Michael D Masinick
(74) *Attorney, Agent, or Firm* — Lumen Patent Firm

(57) ABSTRACT

A system and method is provided for energizing and managing digitally-controlled devices at different levels of granularity, to achieve desired power use characteristics. At the lowest level, a digitally-controlled device is energized using a variable load-sensing adaptive control (VLSAC). Operation of the device is controlled using digital signals input to the device, so that limits on parameters, such as power consumption are met. A plurality of VLSACs can be coupled to a power distribution unit (PDU), which is controlled to achieve desired levels for selected parameters, set for the PDU. Multiple PDUs can be coupled to a power conversion and regulation unit (PCRU), which can be controlled by a master control to achieve a desired power profile for an entire facility, enabling the facility to meet requirements of a utility supplying the power and thus, reducing operational costs. The VLSACs and PCRU include high efficiency power sources having low distortion.

7 Claims, 6 Drawing Sheets

ADAPTIVE CONTROL OF ELECTRICAL DEVICES TO ACHIEVE DESIRED POWER USE CHARACTERISTICS

CROSS-REFERENCE TO RELATED APPLICATIONS

This application claims priority from U.S. Provisional Patent Application 61/437,799 filed Jan. 31, 2011, which is incorporated herein by reference in its entirety.

FIELD OF THE INVENTION

The invention relates to adaptive control of electrical devices.

BACKGROUND OF THE INVENTION

A power consuming facility can include many interconnected pieces of electrical equipment that collectively and dynamically create a power system profile presented to the power utility providing the electrical power to the facility. Three key elements related to a power system profile are power quality, power efficiency, and power system performance. While similar considerations arise in regard to many other kinds of facilities, these elements are particularly important in regard to data processing facilities, since such facilities often impose a substantial electrical load on the utility power system. The load presented to a utility power system by a data processing facility and its resulting power system profile are generally undesirable because of the harmonic distortion and phase imbalance of the load, and because the load is not well managed, for example, in regard to meeting time-of-day, and peak demand power usage considerations of the utility.

There are several reasons why the power profile of a data processing facility tends to differ from that desired by a utility power system. Part of the problem arises because the engineering practices for designing and running a data processing facility at least partially fail to take into consideration the loads imposed by the power supplies of servers and other digital components installed in the facility. In practice, data system engineering and electrical power engineering have two disparate specialties with little in common, other than general interface information. Little or no standardization exists between the pieces of equipment in a data system and the power system that serves it. In addition, the management of the data processing equipment has generally been limited to manual control, which is ineffective in responding in real time to changes in the facility load or to changes in the quality of power being delivered to the data processing facility by the utility, or the demand on the power utility system. Again, however, it must be emphasized that this problem is not unique to data processing facilities, since many types of manufacturing and industrial facilities suffer from the same shortcomings in controlling the electrical load at the facility, and the quality of power characteristics of the load, to achieve a desired power profile.

As used herein, the term "facility" is any collection of electrical devices at a site that share a common power source—usually an electrical power utility. The following discussion is particularly relevant to facilities that include loads that can readily be controlled by a digital signal from a controller. Illustrations of such facilities include a network server farm, a building with computer, switch, and/or router equipment drawing power from the same electrical circuit, a group of residential living spaces, each of which has computers and other digital devices connected to a shared primary electrical utility circuit, and manufacturing and industrial sites with non-linear loads of this type.

A brief discussion of the manner in which electrical power is supplied by a power utility will help to better understand why managing the load at a facility can be important. Electrical power is generated at power plants, hydroelectric facilities, and by other means and conveyed from the generating sources over transmission lines at relatively high voltages (e.g., 60 kV and above) to reduce $I^2R$ losses. Transformers at substations located near the communities where the electrical power will be used reduce the voltage (e.g., to 2400 V or 12 kV) and convey the electrical power at these voltages over distribution lines, as three-phase power. Pole or pad-mounted distribution transformers further reduce the voltage, and the secondaries of these distribution transformers are connected to facilities that use the power.

The load on the utility power system is variable and tends to increase during the day when more power consuming devices are being used in industrial facilities, and as the result of ambient temperature changes that can increase the air conditioning load in buildings. Excessive loading on the power utility system circuits as a result of high air conditioning demand can reduce the voltage on the utility grid and cause "brown out" conditions, which correspond to lower voltages in the power provided to each facility connected to utility distribution circuits. To minimize such problems, utility companies give preference to customers who can manage the electrical load at their facilities to reduce the likelihood of excessive loading on the system when the demand peaks.

However, there are many short term transient effects and longer term effects besides peak demand that can directly impact the quality of the power being delivered to a facility by a utility company. Each time that a distribution switch opens or closes on a utility circuit, transient impulses can be generated that propagate throughout the power grid. Also, changes in loading and the quality of the load at one connected facility can impact the utility distribution circuit supplying power to the facility and thus, can adversely impact connected electrical loads at other facilities on that distribution circuit.

For example, if a facility imposes a substantial reactive load on a distribution circuit, due to a relatively large number of transformers or large motors being energized at the facility, a lagging power factor (shift of the phase angle between voltage and current) can result. Utilities generally prefer that the load imposed by each customer on a circuit be as close to unity power factor as possible. If necessary, capacitor banks may be installed by the utility company to compensate for reactive loads at a facility, but the facility owner may then be assessed a surcharge to offset the cost incurred by the utility for providing that solution. An inequality in the loading by a facility on the three-phase power provided by the utility company can cause lower voltage on the phase of the utility circuit with the higher load, than on the other two phases, which is clearly not desirable for other customers with facilities connected to that distribution circuit.

In the United States, the supply voltage provided a facility may be either three-phase or single phase and is typically a voltage in the range from 220 VAC to 600 VAC. This voltage is supplied to one or more breaker panels in a facility and distributed from the breaker panels to a plurality of circuits within the facility. The power system for a facility may include from one to many thousands of large single or three-phase circuits, as well as small single phase loads. These loads combine to produce an electrical profile for the facility. Electrical power engineers typically specify equipment and circuit requirements for a facility to meet legal limits, standards, and design requirements, including limits imposed by the rate structure of the power utility, based on the maximum anticipated electrical power load that will be connected to the utility. This approach may initially ensure that the expected load can be handled, but if the load later grows and exceeds the anticipated maximum, the problem can be expensive to correct. The typical data facility design does not provide a convenient mechanism to manage the connected load to meet the limits of a given design, or of the power available from the utility company on a circuit.

In addition, since the electrical loads in a facility are typically dynamic, their performance characteristics can change. These variable performance characteristics include resistance, capacitance, inductance, total power consumed, power factor, and total harmonic distortion (THD). The individual, independent changes of each connected load collectively result in changes in the total power profile for a facility that is seen by the utility power system, and which may be measured using conventional means. Managed responses to changes in such system characteristics is presently performed only by the manual intervention of facility operators at the level of the power system, if implemented by power engineers, or at a data processing facility, for example, by manually changing network operating conditions, if implemented by data engineers. Either solution is achieved at a relatively high cost and normally in an inefficient and undesirable manner.

Thus, the separation of the utility system providing power to a facility, on the one hand, and the control of the power consuming devices within a facility, on the other, has led to facility power systems that are uncoordinated, inefficient, and incapable of responding appropriately and expediently to the power requirements of the various connected electrical devices. No system presently exists to provide integrated automated management of a facility's power system profile as presented to a utility system, by the direct control of individual pieces of equipment within a facility using information systems embedded in the facility power system itself, and by taking advantage of loads that can be controlled in response to digital signals, such as digital devices. It would therefore be desirable to provide a method and system for controlling the power system profile of a facility having an electrical load with one or more (perhaps thousands) digitally-controlled devices. It would further be desirable to use system data, control capabilities, and feedback to establish and maintain a desired power system profile for an overall facility in response to changing power and load conditions and the requirements of the utility system. Also, it would be desirable to provide a method and system to achieve power system efficiencies autonomously and thereby improve the power efficiency of digital loads, reduce harmonic distortion and other undesirable power system characteristics produced by digital loads, and thereby save costs compared to manual power management and power conditioning that would otherwise be necessary to mitigate the undesirable power characteristics produced by uncoordinated digital devices within a facility.

SUMMARY OF THE INVENTION

The present invention pertains to controlling digital devices and their operation so as to achieve desired power usage characteristics for those devices. This capability enables modifying the power system profile of the devices with an electrical load, so that a desired profile is presented to the utility power source, by actively and automatically managing the operation of the attached digitally-controlled devices. Thus, the present invention is particularly directed to digitally-controlled devices. As used herein, the term "digitally-controlled device" means any device capable of having some aspect of its operation related to the electrical power that it uses, controlled in response to a digital control signal input to the device.

Power engineers define a worst case/maximum load based on the characteristics of presently existing power loads for a facility and then tend to over build when designing the power systems for the facility. In this regard, a facility may be one or more buildings with related power needs, a server farm or data processing installation, a residential power grid, or some other type of electrical power consuming installation. Digital network and systems engineers, by contrast, work within the power constraints that are provided for a facility, and exploit these until, for example, the connected load exceeds the available limit set by the design or available from the utility company, or until the load causes the power factor to exceed the specifications set by the utility company. If the nature of the load causes the power factor to exceed a level set for a facility, it may be necessary for the facility to pay for the installation and for equipment such as a capacitor bank, which can be used to condition the power factor to meet the utility's specification, or else pay continuing surcharges for the degraded power factor performance. The load at a facility can also cause the THD on a distribution circuit serving the facility to become excessive, which may require further costly remediation, or payment of a surcharge by the owner of the facility.

The present invention provides fully automated control of the digitally-controlled devices at a facility, to respond to the needs of the power system or to achieve desired power system characteristics for the facility. This type of power and load responsive control can manage any electrical load or device that includes a digital interface for enabling such control and can thus match the load to the requirements of the utility power source. By extension, multiple digitally-controlled device can be similarly controlled for this purpose. In addition, a hierarchy of multiple controls may be coordinated for this purpose to achieve a desired power system profile for an entire facility of such digitally-controlled devices.

An exemplary system that includes a variable load-sensing adaptive control (VLSAC) is disclosed herein. Each VLSAC includes a power supply and the controller noted above, which can be a smart card, for use in energizing and controlling an electrical load having a digital control interface, enabling at least one power-usage parameter of the electrical load to be varied. The system further includes a plurality of sensors or analyzers for sensing or determining one or more power parameters of the electrical load. These power parameters include, for example, voltage, current, total power, power factor, and/or THD. The sensors or analyzer produce corresponding sensor signals indicative of these one or more parameters. Also included in the system are means responsive to the sensor signals, for automatically producing a control signal for input to the digital interface of the electrical load, to control the one or more power-usage parameters of the electrical load to achieve a desired power system profile. Means, such as a network, are provided for communicating the sensor signals to the means for producing the control signals, and for communicating the control signals to the digital interfaces of the attached loads. The control signals are operative to change the power consuming characteristics of the electrical loads, to achieve the desired power system profile of the one or more digitally-controlled electrical loads.

This system can also include a power conversion and regulation unit (PCRU) with a power source for providing electrical power to a plurality of VLSACs and can optionally include an uninterruptible battery backup power source to energize one or more electrical loads in the event that electrical current from a power source, such as the utility company that is normally used to energize the electrical loads, is interrupted. The PCRU can provide electrical power to a plurality of intermediate devices, such a power distribution units (PDUs), which in turn, distribute the electrical power to the VLSACs, to energize the digitally-controlled devices. In this manner, it is possible to employ a hierarchical system that can modify one or more power usage parameters of groups or specific selected digitally-controlled devices, to achieve a desired power system profile for the entire electrical load. A plurality of such electrical loads may include an entire facility, so that the power system profile for the facility can thus be controlled.

The PCRU can send control signals either directly to VLSACs, or to intermediate devices, such as PDUs, which then send the control signals to VLSACs connected to the PDUs, to alter a performance or power usage setting of one or more attached digitally-controlled devices and thereby control the power system profile presented to a utility system. In at least one exemplary embodiment, multiple PCRUs can be coordinated via communication through a communication network (wired or wireless) to adjust the algorithms and thresholds by which each controls the attached electrical loads that it energizes, so that together, the multiple PCRUs achieve a desired power system profile for a relatively large facility in which the electrical loads and the PCRUs that energize the electrical loads are disposed.

Power sources (i.e., power supplies like the AC Link™ source) used in the PCRUs and the VLSACs can eliminate the need for attached electrical loads to have their own power supplies, e.g., can replace conventional switched mode power supplies and can transform AC utility current to the various DC voltages needed by each digitally-controlled device having the electrical load. This approach has substantial advantages over conventional power supplies that do not include performance modifying control interfaces. These power sources provide DC power and performance controls in contrast to the inefficient and power-factor degrading switched mode power supplies and transformers typically used as power sources in digital devices. These power sources and power conversion techniques can substantially reduce electrical noise and harmonic distortion, maintain a better power factor (i.e., closer to unity), are more compact, are more cost effective, and are very efficient.

DETAILED DESCRIPTION

Overview

It is emphasized that the approach discussed herein for controlling one or more digitally-controlled devices or electrical loads, is not in any way limited only to such devices that are servers or computer equipment. Further, it is emphasized that the facilities, which might benefit from this technology, are not limited only to data processing centers. Although much of the discussion that follows is directed to just that type of facility and load, the choice to use this type of digitally-controlled device and type of facility was made because this exemplary application readily demonstrates how the present invention can be beneficially employed. Also, it should be noted that the present invention is applicable to a single digitally-controlled device, as well as to hundreds or even thousands of such digitally-controlled devices. Other digitally-controlled devices to which the present invention is applicable besides servers include, without any intended limitation, blade servers, mainframe computers, desktop computers, laptop computers, net book computers, routers, switches, telecommunication equipment, and any other type of digitally-controlled device.

Indeed, devices such as elevators, manufacturing machines, robots, and almost any type of device that has an interface enabling some power-consuming aspect of the device's operation to be controlled in response to a digital signal input either or a wire or wirelessly to the device can benefit from the present invention being used to modify the operation of such a device to control one or more power-related parameters of the power usage by the device. As a further example, a facility may include a plurality of elevators used for moving either freight and/or people between floors in the facility. The elevator control system can be digitally-controlled, so that to reduce the load imposed on the power system in the building, one or more of the plurality of elevators can be temporarily locked out of operation, and then subsequently restored to operation, when there is no longer a need to reduce the electrical load of the facility. Or, if variable speed motors are used for a manufacturing device and the speed of the motors is digitally controlled, that control signal to the motors can be selectively provided to either reduce or increase the electrical load, or current draw, by the motors. These and other examples of how various types of digitally-controlled devices may be controlled to modify power usage parameters of the devices will be apparent to those of ordinary skill in the art.

Figure 1:
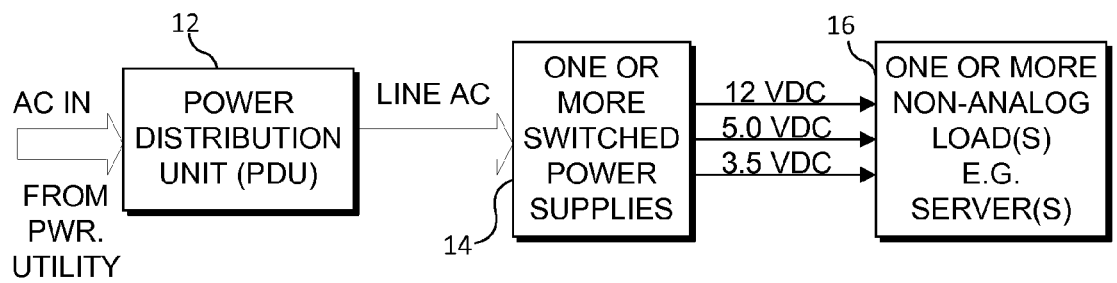
FIG. 1 (Prior Art) is a block diagram illustrating a conventional system for supplying power to one or more non-analog (i.e., digital) loads, such as one or more servers or other computing devices.

It may be helpful to contrast the prior art approach used to control electrical loads with the present invention. FIG. 1 (Prior Art) is a functional block diagram 10 that illustrates how AC line electrical power from a power utility that is distributed on a circuit in a facility is input to a power distribution unit (PDU) 12. FIG. 1 indicates that a switched mode power supply 14 (disposed, for example, within a server chassis) is energized with single phase line AC current distributed by PDU 12. The switched mode power supply produces a plurality of different DC voltages to energize one or more non-analog (or digital) components within the device being energized. For example, the DC voltages supplied by a switched mode power supply disposed in the chassis of a server 16 might be 12 VDC, 5.0 VDC, and 3.5 VDC, and the leads carrying these voltages would be connected to different portions of the server motherboard and other components, such as hard drives, that are installed within the server. The PDU is typically used to supply AC power to the switched mode power supply of each of a plurality of such servers that mounted in a server rack (not shown).

Conventional PDUs have only a limited capability for monitoring and controlling the power consumed by the loads connected to the PDU. A conventional PDU may include sensors for monitoring current, voltage, and/or power, and can be configured to power loads up or down in a predefined sequence, warn of potential overloads, and be controlled externally by manually input signals. However, conventional PDUs do not have any provision for automatically varying operating conditions of a server to vary power usage characteristics of one or more of the connected servers in regard to a achieving a predefined limit or to meet a desired power system profile.

Another problem with a prior art configuration like that shown in FIG. 1 is that switched mode power supplies produce higher than desired THD and noise. The resulting distortion and noise then appears on the AC line in the facility is coupled to these power supplies, and if there are many such power supplies operating in a facility, the quality of the power on the utility circuit to which the facility is connect will be adversely affected. It would therefore be preferable to use a different type of power supply for each server that produces less electrical noise and THD than the ubiquitous switched mode power supply. One such power supply is based on a design originally created as a variable speed motor power supply that operates on a three-phase utility power input. This design is sold by Princeton Power Systems, Inc., as the AC Link™ power source. A modified version of the AC Link™ power source is designed to energize digital loads and has significant benefits compared to use of a switched mode power supply for this purpose. For example, the AC Link™ power source has a relatively small footprint for the rated power that it provides and can be used to provide DC power at different voltages directly to one or a plurality of electrical loads, such as rack-mounted servers, thereby eliminating the need for internal conventional switched mode power supplies in each such load. The power source design also minimizes transformer losses, can be modified to provide an AC power output in addition to a DC power output, can be coupled to a network to enable the power source output power level to be digitally-controlled, can be energized at higher voltages (e.g., 480 or 600 VAC) than conventionally used to energize switched mode power supplies, and operates at a high efficiency, with less than 3% loss, and with a minimal harmonic distortion level. The use of such a power source for energizing digitally-controlled devices avoids introducing noise and THD such as would be caused by switched mode power supplies, and reduces the cost of the power used because of their increased efficiency. However, it is not intended that the present invention be limited to use the modified AC Link™ power source, although this power source clearly provides advantages. It is contemplated that other power supply designs might also be employed instead of AC Link™ power sources to provide electrical power to digitally-controlled devices in the present invention.

In the present invention, the power consumption and other power use characteristics of selected electrical loads can be digitally-controlled. As a result, it is possible to automatically control at least some aspects of the overall electrical load characteristics of those devices, and of the facility in which they are disposed. In regard to electrical loads such as servers and other digital equipment, the requirement for digital control can be met, for example, if the device conforms to Intel Corporation's Data Center Manageability Interface (DCMI) Specifications, which were derived from the Intelligent Platform Management Interface (IPMI), Version 2.0. The DCMI Specifications were developed to define a uniform set of monitoring, control features and interfaces targeting management of server systems used in data centers, where the number of servers may be in the tens of thousands. DCMI enables sensing of server power consumption and the temperature of each such server in a relatively efficient manner, and identifies the specific server that is the source of the data using conventional TCP/IP functionality. A specific load to be monitored/managed can be selected based on the media access control (MAC) address (or other unique identifier) of the digitally-controlled device on a communication network, such as an Ethernet network.

The control available through DCMI enables setting a power limit for a load, activating/deactivating the power limit, and causing the electrical load to change the way it operates so as to vary the power consumed. For example, the DCMI control has been used in conventional power management scenarios to manually cause the clock rate of a CPU in a selected server in a rack of servers to be increased or decreased to change power consumption or control the operating temperature of the CPU, but this control is exercised manually and is not automatically controlled. Further, the management of digital devices using DCMI has in the past been carried out in response to data processing concerns, such as ensuring that the facility can meet a current processing load, or in response to rising temperature levels in specific devices, and not for the purpose of achieving one or more desired electrical power characteristics for a facility, such as ensuring that a desired power system profile is presented to a power utility.

Time-of-day power consumption rates may be higher at certain times of the day. Using the present invention, the power consumed in a facility by digitally-controlled power consuming devices can be automatically managed so that the facility can operate within power utility limits, which may change at specified times of the day. This approach can thus reduce the cost of electrical power consumed by the facility. There may also be advantages in automatically controlling the digitally-controlled devices in a facility to meet power utility limits during extreme environmental temperature conditions, when the overall demand on the power utility rises to excessive peak levels, in accord with a peak demand contract.

Another advantage of automatically controlling the power usage characteristics of digitally-controlled devices is to control the quality of power as affected by devices at a facility, and to compensate for undesirable quality in the power supplied to a facility. For example, THD caused by certain loads on a power utility distribution circuit may increase to levels that can cause damage to the digitally-controlled devices at a facility using the present invention. By including means for managing the THD of power input to the facility, such as by injecting compensating signals, this distortion problem can be addressed. Also, the THD produced by digitally-controlled devices at the facility can be controlled by changing the load level of selected devices.

Other types of digital control procedures can be employed to modify the power usage characteristics of a load. For example, the power consumption of a digital switch for an Ethernet network can be reduced by blocking selected ports (in a rotating selection scheme) for a brief time, so that communication through the digital switch is limited to fewer than all of the normally available ports at any given instant. Or, the bit rate of a digitally-controlled device, such as a router or a network interface card can be temporarily reduced to reduce its power consumption. Even more dramatic changes in power consumption of electrical devices can be achieved by de-energizing selected devices or components of a device, particularly when they are not needed to meet a processing or other demand. For example, in a computer that includes two digital adapters, one of the adapters can be de-energized when not needed for rendering complex graphics. These and other mechanisms for using a digital signal to control the power characteristics of a digitally-controlled device will be evident to those of ordinary skill in this area of technology.

Exemplary Embodiments

One point that should be emphasized about the present invention is that it is applicable at different levels of granularity, when employed in a hierarchical scheme. At one end of the granularity spectrum, the present invention can be applied to controlling the power characteristics of a single digitally-controlled device, such as shown in a block diagram 20 in FIGS. 2A and 2B. This same approach, but using additional control layer components, may also be applied in regard to managing the electrical power use characteristics of increasing numbers of digitally-controlled devices, as further described below.

Figure 2A:
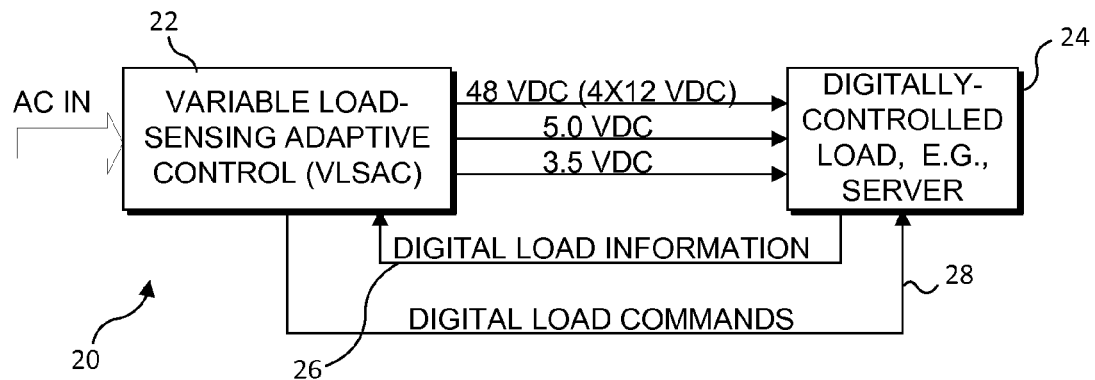
FIG. 2A is a functional block diagram of an exemplary variable load-sensing adaptive control (VLSAC) in accordance with the present invention, where the VLSAC represents the most atomic (i.e., lowest) level of granularity in a hierarchy of power system controls.

As shown in the example illustrated in block diagram 20 of FIG. 2A, AC power from a power utility source (or other conventional source) is applied as an input to a variable load sensing adaptive control (VLSAC) 22. The VLSAC is described in more detail below, but can include a modified AC Link™ power source, as discussed above, so that it directly supplies DC power to a digitally-controlled device 24, at a plurality of appropriate DC voltages. In this example, these voltages are 48 VDC (i.e., 4 times 12 VDC), 5.0 VDC, and 3.5 VDC. These voltages are typical of the voltages that are used to energize a digitally-controlled device, such as a server. It should be noted that digitally-controlled device 24 therefore does not require any additional internal power supply, since VLSAC 22 effectively replaces a switched mode power supply (or other type of conventional power supply) that would normally have been provided within the chassis of the digitally-controlled server. The digitally-controlled device can provide digital load information to VLSAC 22 over lines 26 and, although this digital load information may be at least partially redundant, since the AC Link™ power source includes voltage sensors and might readily include current sensors, it is preferable to receive digital information, such as load and operating temperature, directly from the digitally-controlled device.

Figure 2B:
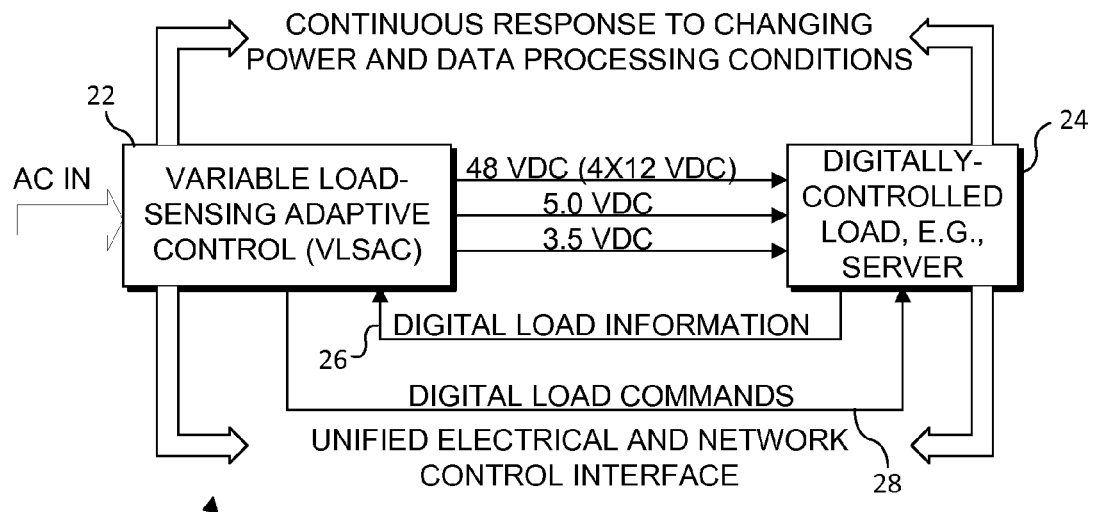
FIG. 2B is a functional block diagram for the VLSAC of FIG. 2A according to the present invention, illustrating its enhanced functionality in regard to energizing and controlling the power usage of a digitally-controlled device, such as a server.

To control the power usage characteristics of digitally-controlled device 24, VLSAC 22 can provide digital commands to the digitally-controlled device over data lines 28 that modify its operation so as to change its electrical load. As indicated in FIG. 2B, this configuration facilitates a continuous automated response by the digitally-controlled device to changing power and data processing conditions and requirements and presents a unified electrical and network control interface when VLSAC 22 and digitally-controlled device 24 are a part of a more complex set of VLSACs and digitally-controlled devices that are coupled to the power system at a facility.

Figure 3:
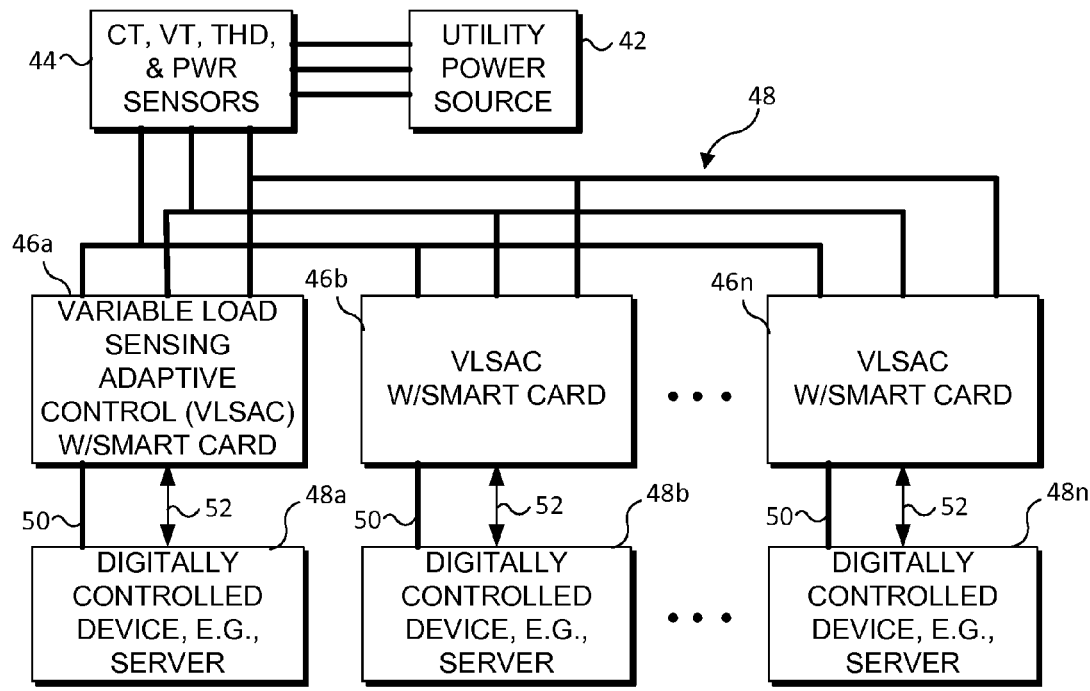
FIG. 3 is a functional block diagram of an exemplary system according to the present invention including a plurality of VLSACs that each energize and manage separate digitally-controlled devices, wherein this embodiment is more complex than the single VLSAC embodiment of FIGS. 2A and 2B.

FIG. 3 is a functional block diagram 40 that illustrates an example of a higher level of complexity in which a utility source 42 supplies three-phase AC electrical power that is monitored by one or more of a plurality of power sensors 44. These power sensors may include, for example, current transformers (CTs), voltage (or potential) transformers (VTs), a signal analyzer to determine THD, a power factor sensor, and one or more power sensors (i.e., a watt sensor and optionally, a volt-ampere-reactive (VAR) sensor). While not shown in FIG. 3, a data link couples the output signals from these one or more power-related sensors to each of a plurality (i.e., n) VLSACs (with smart cards) 46a, 46b, . . . , 46n. The smart card is a component in the VLSACs that provides the control functions to manage the power use characteristics of digitally-controlled devices 48a, 48b, . . . , 48n, which are each energized with the output power provided by a corresponding different one of the VLSACs that are supplied electrical power over leads 50.

Digital control signals to the digitally-controlled device and information from the digitally-controlled devices are coupled to the VLSAC providing the power to the digitally-controlled device through data lines 52. Thus, each VLSAC is able to automatically control the operation of the digitally-controlled device and manage the power use characteristics, such as load, for the device energized by it, to achieve a desired power system profile characteristic or to control one or more power usage parameters. Also, since each VLSAC can be coupled to a data network, such as the Ethernet network at a facility, and can be assigned an address according to the TCP/IP model, each of the VLSACs can be selectively addressed and controlled so that the VLSAC then manages its digitally-controlled device to achieve an overall power system profile or desired power parameter for all of the VLSACs in a group. The control signals to which the VLSACs respond to control their respective managed digitally-controlled loads can be provided by a master control (or computing device) that is either geographically remote, or located at the same facility as the plurality of n VLSACs are disposed.

Figure 4:
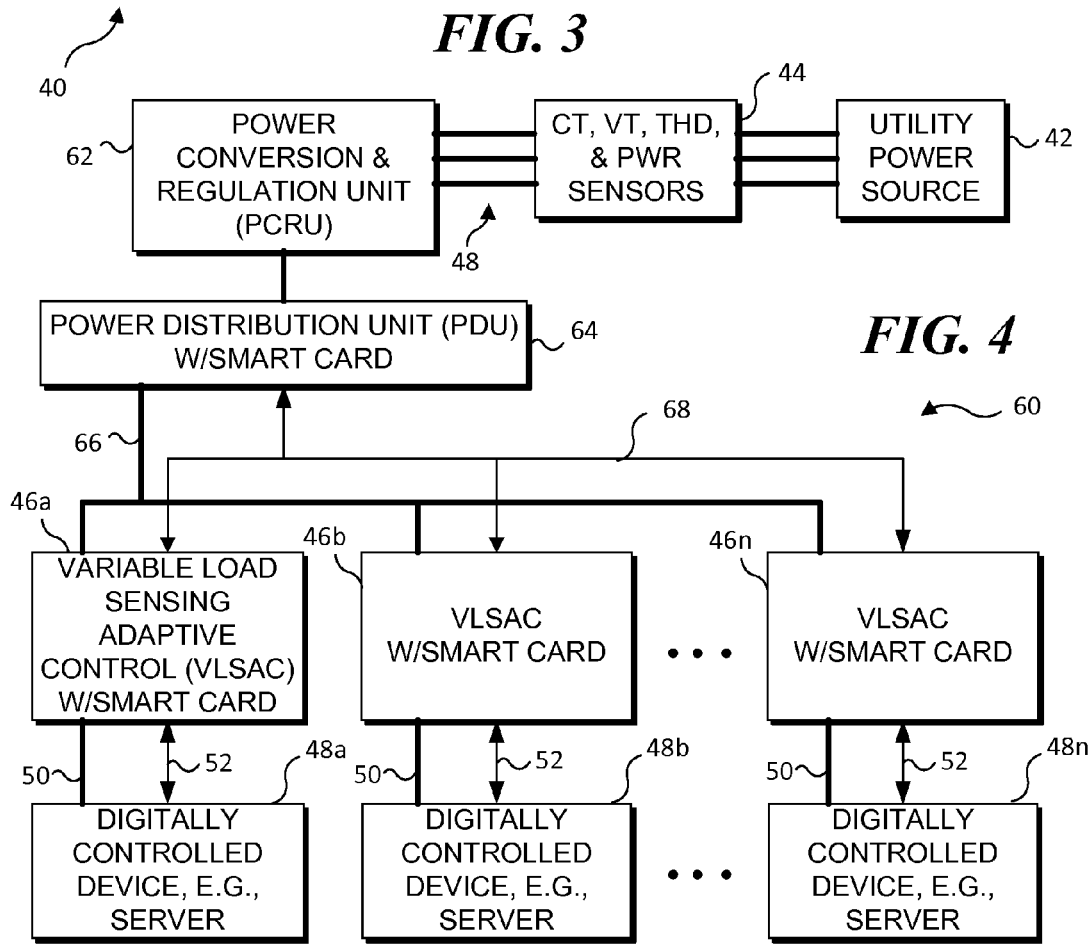
FIG. 4 is a functional block diagram showing an exemplary embodiment according to the present invention of two higher levels in the hierarchical granular approach, by including a power conversion and regulation unit (PCRU) and a power distribution unit (PDU) with a smart card or controller in addition to the components of the exemplary embodiment shown in FIG. 3.

A still higher level of granularity (and complexity) for control of digitally-controlled devices at a facility is illustrated in a functional block diagram 60, in FIG. 4. In this exemplary embodiment, the configuration of FIG. 3 is modified by adding a power conversion and regulation unit (PCRU) 62 and a power distribution unit (PDU) 64. PCRU 62 can optionally include an uninterruptible power supply (UPS), which is not shown in this Figure. The UPS includes batteries that are trickle charged and are then available to provide power to energize the digitally-controlled devices when electrical current from the normally used power source, such as the utility power grid, is interrupted. In addition, the PCRU includes a larger power source (power supply), e.g., an AC Link™ power source, having a three-phase AC output that is coupled to PDU (with smart card) 64. The output of the PDU is also an AC voltage and is input to each of the plurality of VLSACs 46a, 46b, . . . , 46n, as discussed above.

It should be understood that it is not essential to include PDU 64 in the present system. Typically, a conventional three-phase PDU has one purpose in a server rack installation and that is to separate the three-phase power on a circuit connected to the input of the PDU into three single-phase circuits to provide single phase power to several switched mode power supplies in corresponding servers mounted in the server rack. However, since each VLSAC can be energized directly from a three-phase source, a PDU is not needed for this purpose in the present exemplary system. If PDU 64 is used in the system of the present invention, it can be employed to achieve an intermediate level of control in the hierarchy of the granular system, since it can be disposed between the PCRU and a plurality of VLSACs that are connected to the PDU. Also, it should be noted that in a rack in which some servers that are energized with conventional switched mode power supplies are retained, the PDU might be used to provide the required single phase power to the servers with the switched modes power supplies. However, mixing conventional switched mode power supplies with VLSACs is less desirable, because it introduces unnecessary complexity.

As shown in FIG. 4, the sensor signals from power sensors 44 are input to PCRU 62. A smart card (not separately shown) in the PCRU then provides control signals to the smart card in PDU 64 (if the PDU is used), or directly to the VLSACs (if the PDU is not used). These control signals command a PDU (or a selected set of VLSACs if the PDU is not included) to modify the operation of the digitally-controlled devices to achieve a desired electrical load or other power parameter characteristic. If the PDU is used and received the control signals from the PCRU, the PDU further provides control signals on leads 68 to selected ones of the VLSACs that it energizes with electrical power on leads 66. This system can thus exercise increasingly finer hierarchical control of the power usage parameters of the digitally-controlled devices, starting at the highest level for PCRU 62, and working down the levels, to specific selected ones of VLSACs 46a, 46b, . . . , and 46n. Thus, changes in the operation of a number of the digitally-controlled devices supplied power by PCRU 62 can affect the electrical load energized by it or by the PDU, and thus, change the power system profile of the facility that is seen by the utility company. Selective control of a specific one of the VLSACs can fine tune the power usage characteristics of the digitally-controlled device that it energizes, or can be employed as part of a larger control scheme that changes the operating parameters and thus, the load of a plurality of such digitally-controlled devices, to achieve a desired overall power system profile for the load energized by PCRU 62. In this scheme, the smart card in the PCRU responds to the sensor signals provided by power sensors 44, and the PCRU produces commands that control the PDU (if used) so as to achieve a desired change in load or other parameter; the smart card in the PDU selects one or more specific VLSACs to control and sends control signals to the smart card in each selected VLSAC that cause the VLSAC selected to modify the operation of the digitally-controlled load it energizes to achieve the change in load or other desired power parameter commanded by the smart card in the PCRU. It should be noted that although a single PDU 64 is shown in FIG. 4, one or more additional selected PDUs can similarly be controlled by the commands from the smart card in the PCRU, to modify the operation of the VLSACs to which each such selected PDU provides power and thereby, control the operation of even more digitally-controlled devices in a facility. If PDU 64 is not used, the commands from the PCRU can be directly supplied to smart cards in one or more selected VLSACs to cause the modification of the operation of the one or more selected VLSACs to achieve a change in the load or other power parameter as commanded by the control signals from the PCRU.

Figure 5:
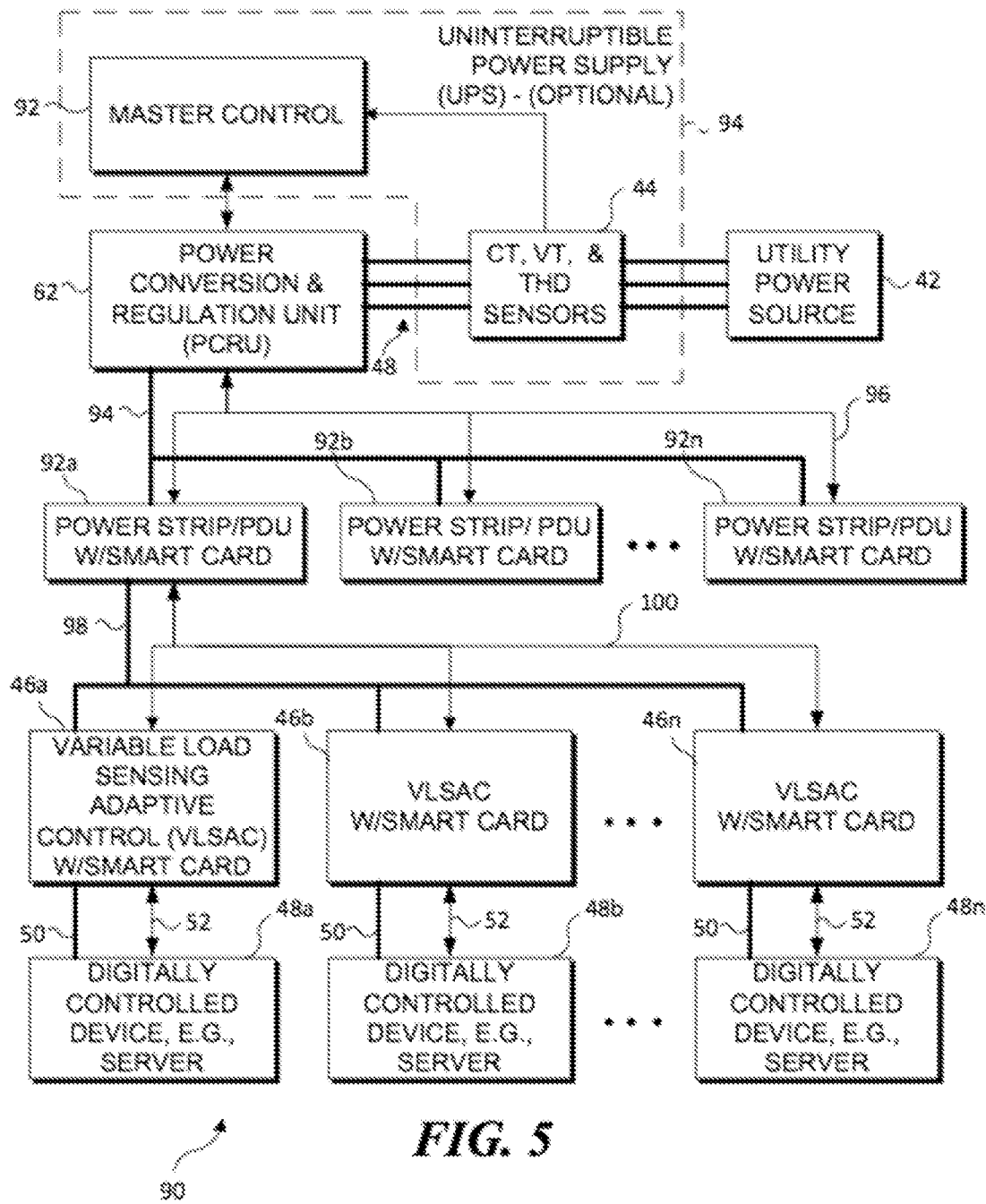
FIG. 5 is a functional block diagram illustrating another exemplary embodiment according to the present invention at a yet higher granular level, in which a master control is included to control a PCRU that supplies power to a plurality of power strips and/or PDU units with smart cards.

Yet a still higher level in the granularity hierarchy for controlling power use is illustrated in a functional block diagram 90, which is shown in FIG. 5. This exemplary configuration includes a master control 92. While the master control might be entirely separate or included in the PCRU or other component, or may be a computer device, in this exemplary embodiment, the master control is provided as part of an optional UPS 94 that also includes power sensors 44. In this embodiment, PCRU 62 provides AC power through leads 94 to energize a plurality (i.e., n) of power strips/PDUs (with smart cards) 92a, 92b, . . . , 92n. Each power strip/PDU is coupled through leads 98 to a plurality of VLSACs 46a, 46b, . . . , 46n. And, each VLSAC is coupled to directly provide DC power to a different digitally-controlled device 48a, 48b, . . . , or 48n through leads 50. Data leads 100 couple the VLSACs to the power strip/PDU that energizes them to provide information from the VLSACs and to receive and apply control signals received from the power strip/PDU to selected one or more VLSACs, that cause the selected VLSAC to modify the operation of a digitally-controlled device energized by the VLSAC and thereby affect the load or another power parameter of the power system in the facility. In this manner, the load or some other power parameter of the digitally-controlled devices energized by the selected one or more VLSACs, can be selectively controlled to achieve a desired level or desired power system profile for the overall facility.

In this configuration, it is the master control that governs the other components of the system to achieve a desired power profile, or other power parameter characteristic. The control signals that are automatically generated by the master control, can be employed to control the PCRU, which then cascades that control to a selected one or more power strips/PDUs, and which then control one or more selected VLSACs. This hierarchical granular arrangement achieves a desired power use characteristic for the facility, or for one or more racks of digitally-controlled devices, or for one or more selected digitally-controlled devices in a rack. Further, the automated approach gives tremendous flexibility in achieving a desired load or other power parameter characteristic, and can be employed for meeting specific requirements of the power utility. Accordingly, the system can readily control the entire electrical load or selected portions of it, as necessary to meet time-of-day power usage requirements or peak power demand requirements of a power utility and thereby reduce the charges for electrical power incurred by a facility.

Also, because the facility may include more efficient power sources, such as the AC Link™ in each of the one or more PCRUs, as well as in the VLSACs that energize each digitally-controlled device, the facility is more robust in withstanding and compensating for fluctuations, noise, and THD in the power provided by the utility company, and avoids adding noise, THD, and degrading the power factor. For example, if a neighboring facility includes a number of motors that periodically are energized and de-energized, or includes noise producing loads such as arc welders, specifically metal inert gas (MIG) and tungsten inert gas welders (TIG), plasma cutters, and other variable frequency load devices, etc., the power on the circuit shared with that neighboring facility will suffer a degradation as a result of such loads. However, unlike the switched mode power sources used in conventional digital loads, the AC Link™ or similar power sources can help to isolate the digitally-controlled devices from such adverse conditions on the incoming electrical power and also do not add much additional THD, noise, or other undesired characteristics to the power grid. As noted below, THD on the power supplied by the utility grid can also be reduced by using active compensation, such as with an active THD compensation injection unit, to avoid an adverse impact on the digitally-controlled devices at the facility using the present invention.

Figure 6:
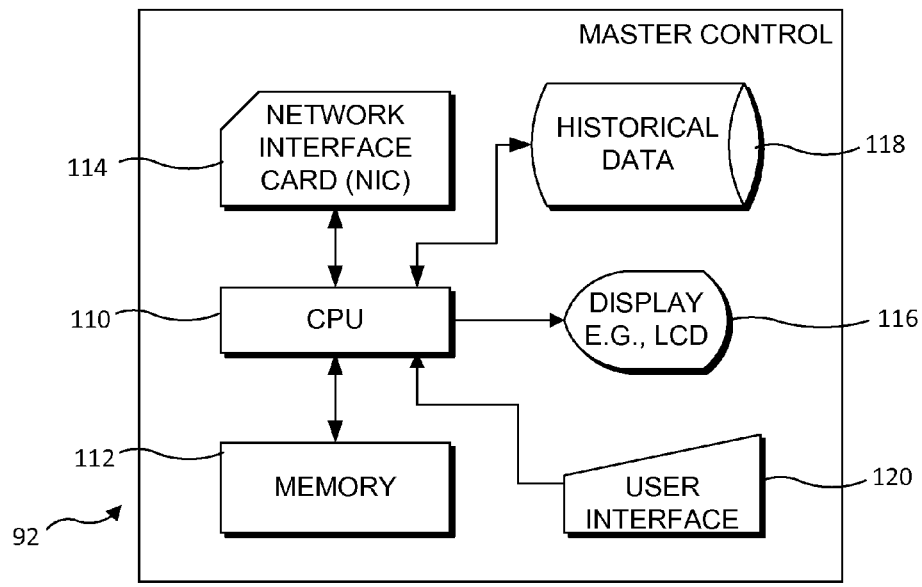
FIG. 6 is according to the present invention an exemplary functional block diagram of the components included in the master control shown in FIG. 5.

Turning now to FIG. 6, details of exemplary master control 92 are illustrated. In this embodiment, a CPU 110 (or other type of logic device) is coupled to a memory 112. Memory 112 may include both random access memory (RAM) and read only memory (ROM), although these are not separately shown. Also connected to CPU 110 are a network interface card (NIC) 114, a display 116, such as a liquid crystal display (LCD), a non-volatile storage 118 (such as a hard drive) for storing historical data and other data, and a user interface 120. The user interface can include a conventional QWERTY (or other) keyboard, or a smaller keypad, and/or a pointing device, such as a mouse, a trackball, or a touchpad/touch screen, and can be employed for entry of commands and making selections used to define the desired parameters referenced by the master control so that it automatically controls the power consuming digitally-controlled devices, as discussed herein. It should be noted that the master control can be a conventional desktop computer, a laptop, or other computing device, but may also be a dedicated control device, or an application specific integrated circuit (ASIC) or other hardwired logic device. Further, the master control can be located at a facility that it controls, can be part of another component such as a PCRU, or can be remotely located to couple with the PCRU or other components over a local area network, or over the Internet, or via a wide area network.

Figure 7:
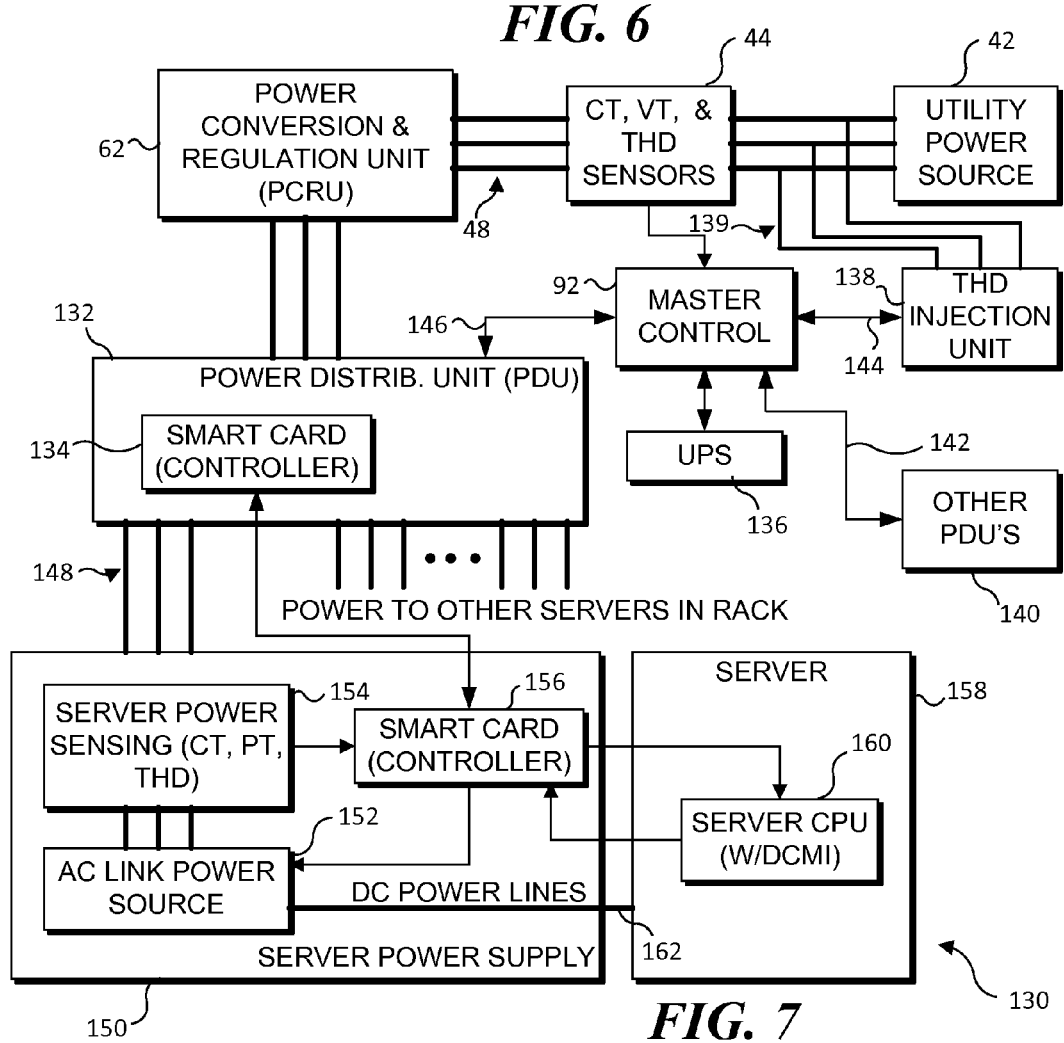
FIG. 7 is according to the present invention a functional block diagram illustrating additional details of an exemplary embodiment in which a PCRU receives electrical power from a utility source and provides power to a PDU that energizes a plurality of VLSACs' used to provide power a plurality of servers, whereby the PDU is controlled PCRU, which is in turn controlled by the master control, to achieve a desired power system profile for a facility.

FIG. 7 illustrates a functional block diagram 130 showing another exemplary embodiment, with additional details. This embodiment also includes a PCRU 62 that is coupled to a PDU 132 having a smart card 134. Master control 92 is separate and is coupled bi-directionally to PDU 132 (and thus to smart card 134) via data and control lines 146. These data lines may include an Ethernet, or other network, and can also employ TCP/IP, ACSI, Mod Bus, or Can Bus protocols, or other appropriate protocols. As shown in this Figure, master control 92 is also connected to a UPS 136, to a THD active filter injection unit 138 via control lines 144, and to other PDUs 140 by data and control lines 142. The active filter THD injection unit can be employed to inject compensating signals into power input lines 48, over lines 139, to compensate for the THD present on the input power (or, in the alternative, the compensation for excessive THD on the power supplied by the utility can be injected internally into the input power leads of the VLSACs). Unless required to prevent damage to the digitally-controlled devices, it is preferable not to employ THD active filter injection unit 138, since it consumes additional electrical power, which increases the cost to operate the facility. Because the AC Link™ power sources or similar power sources used in the present invention to energize each level of the present system produce very little THD and help to isolate the digitally-controlled loads from incoming THD, it is likely that the active filter THD injection unit will only be employed rarely when the THD on the utility circuit caused by other customer loads on the utility distribution circuit is truly excessive.

A VLSAC 150 is illustrated in FIG. 7 and includes server power sensors 154, such as CTs, PTs (or direct voltage sensing), and a frequency analyzer to determine THD, which each produce sensor signals indicative of the power characteristics of the electrical power input to the VLSAC. The electrical input power is supplied to an AC Link™ power source 152 (or other similar type of power source), which produces the DC power at appropriate voltage levels on leads 162, to energize a digitally-controlled device, i.e., a server 158, in this example. A smart card 156 functions as a device controller within VLSAC 150 and responds to control signals or commands from smart card 134 in PDU 132, which in turn responds to control signals or commands from master control 92. Smart card 156 provides digital signals to control a server CPU 160, for example, in accord with the DCMI specification. Thus, the server power consumption can be controlled, for example, by changing the CPU clock rate, or by modifying other aspects of the digitally-controlled device (if it does not include a CPU). It will be apparent that other VLSACs that are not shown are also energized with the AC power output from PDU 132 over corresponding power leads 148. The smart cards in these other VLSACs are also controlled with control signals or commands from smart card 134 in PDU 132, in response to commands from master control 92. The master control is also coupled to PCRU 62 (although the data and control lines are not shown in this Figure), and controls it as discussed above. It should be noted that master control 92 may control PCRU 62, so that it provides control signals and commands to PDU 132 rather that the control signals being provided directly to the PDU by the master control. Accordingly, it will be apparent that a number of different control configurations can be achieved within the scope of this invention.

Figure 8:
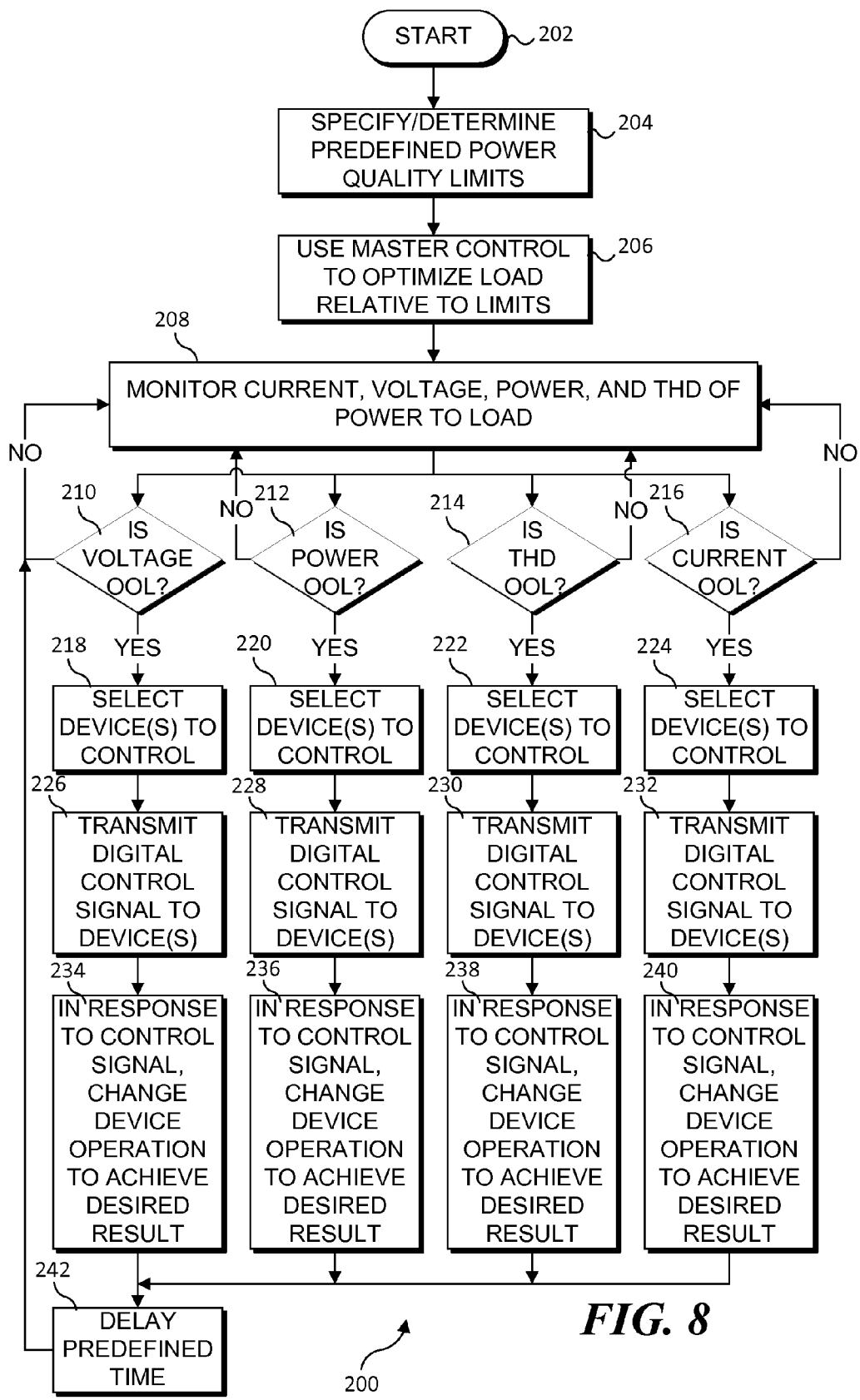
FIG. 8 is according to the present invention an exemplary flowchart illustrating the steps employed in controlling a digitally-controlled device to achieve a desired power usage characteristic.

An overview of exemplary steps for controlling the power usage characteristics of a digitally-controlled device, whether a single such load, or thousands of such loads, depending on the level of the granular hierarchy at which the control is exercised, is shown in a flowchart 200 in FIG. 8. Following a start block 202, a step 204 provides for either specifying or determining predefined power quality limits. These limits may be specified to achieve a desired power profile for the facility in regard to the load it represents on the utility power system or may be specified to meet time-of-day power usage limits or other utility-specified power related limits, or to achieve other power usage goals. Without any intended limitation, these power quality limits may, for example, be any one or more of: a maximum power consumption (watts and/or VARs) by one or more digitally-controlled devices; a maximum harmonic distortion for the load(s); a power factor level (i.e., a maximum deviation from unity power factor); a maximum current draw by the load(s), and a maximum load imbalance. Further, the power quality limits may be manually input by an operator, or be based on data in a look-up table or other predefined data. The specified power quality limit(s) may be provided by the power utility, for example, in regard to a peak demand contract, or time-of-day metering, or other specification. Alternatively, the master control may automatically determine the power quality limits based on an algorithm that considers such inputs as temperature, humidity, time of day, and/or load currently experienced by the utility system, to name a few, without any intended limitation.

A step 206 then uses the master control (or other logic or computing system) to determine how to modify the electrical load of the digital controlled device(s) relative to achieving the power quality limits specified or determined in step 204. The discussion provided above explains how control of the power usage characteristics or power parameters of a facility's electrical load that includes digitally-controlled devices can be applied at different levels of hierarchical granularity. This process begins with a step 208, which uses appropriate sensors such as transformers to monitor current and voltage, determine power consumption, and power factor, and may employ a signal analyzer to determine the THD of the electrical power being provided to the digitally-controlled devices. It should be emphasized that not all of the parameters must be monitored, and that other parameters, such as electrical noise, may instead or also be monitored. Accordingly, these parameters are simply exemplary. Based on the power sensor (and/or signal analyzer) signals, which are converted from analog to digital values as appropriate, the logic can then determine if the voltage is out of limits (OOL) in a decision step 210, and/or if the power consumed is OOL in a decision step 212, and/or if the THD is OOL in a decision step 214, and/or if the current is OOL in a decision step 216 (or to determine if some other power related parameter is OOL).

If the result of any of these decisions is that the parameter is not OOL, then the logic simply continues monitoring the parameter(s). However, if any of these power parameters is OOL, appropriate remedial control action is implemented by the master control (or other logic device). Specifically, if the voltage is OOL, a step 218 selects the device or devices to control to correct the OOL condition. This step can select one or more PCRUs (and any of the digitally-controlled devices that are energized by the selected PCRU), one or more PDUs or power strips (and any of the digitally-controlled devices that are energized with power supplied thereby), or one or more VLSACs (and the digitally-controlled device energized by each selected VLSAC), depending upon the level of granularity of the present system at which the control is to be applied. Similarly, the one or more devices are respectively selected in steps 220, 222, or 224, if the power is OOL, the THD is OOL, or the current is OOL.

Following step 218, a step 226 transmits a digital control signal to the one or more devices that were selected. Similarly, following any of the steps 220, 222, or 224, a respective step 228, 230, or 232 transmits a digital control signal to the one or more devices that was selected. In steps 234, 236, 238, and 240, the one or more devices that were selected respond to the control signal by changing their operation so that the OOL parameter is adjusted by a predetermined increment, e.g., by 5%. For example, if the voltage being supplied to the digitally-controlled loads is too low (i.e., OOL on the low side), the electrical load of each selected digitally-controlled device can be reduced, which will cause the supply voltage to increase. Various examples have been provided above that illustrate how a digitally-controlled device can be commanded to reduce the electrical load it imposes; for example, a server CPU can be commanded to operate at a lower clock rate, which will reduce the electrical power consumed by the server. Similarly, for OOL current, power, or THD, the load imposed by the selected digitally-controlled devices can be modified to reduce the amount by which the specific parameter is OOL.

Following steps 234, 236, 238, and 240, a step 242 delays a predefined time interval, for example, for two minutes (although other predefined time intervals may be employed instead). This predefined time interval enables the system to change the operation of the device(s) that are selected so as to correct the OOL condition and then provides the time needed to stabilize the system at the new level of the modified parameter. The logic then returns to step 208, to monitor the various power parameters, as described above, and to determine in the following decision steps, if the one or more parameters are now all within limits. If any of the parameters is still OOL, then the procedure described above is repeated so as to modify the operation of the selected one or more digitally-controlled devices sufficiently further adjust the parameter by the predetermined incremental amount, and this process is repeated until none of the parameter(s) are OOL. While not shown, it is contemplated that the logic will periodically return to step 204 instead of step 208, to check if the predefined power quality limits have changed.

Figure 9:
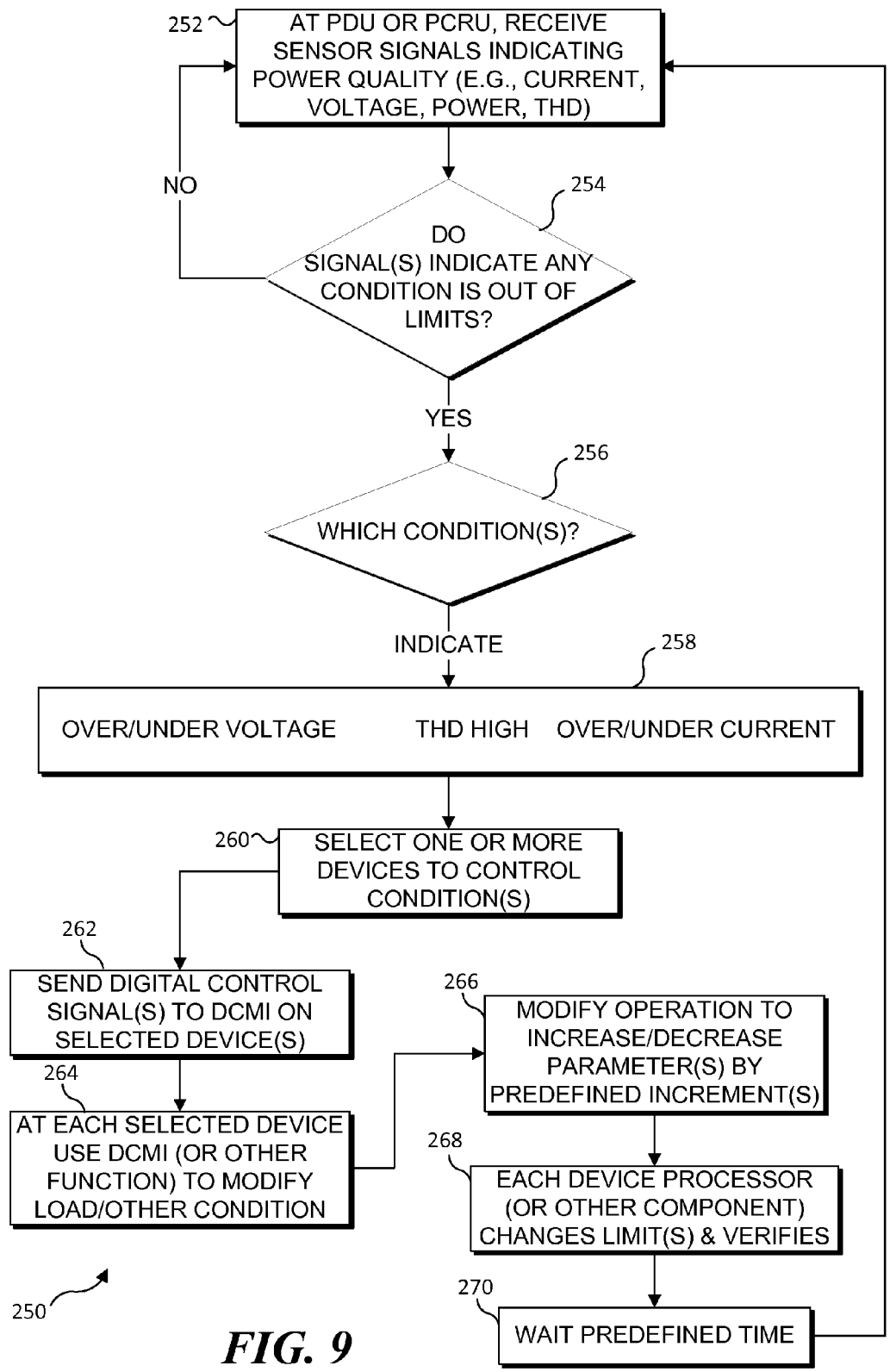
FIG. 9 is according to the present invention an exemplary flowchart illustrating the steps employed by a PDU or PCRU to control VLSACs so as to control the digitally-control devices energized by the VLSACs.

FIG. 9 illustrates a flowchart 250 that shows exemplary logical steps carried out at a PDU or PCRU, which are similar to those carried out by the master control. In a step 252, the PDU or PCRU receives sensor signals indicative of power quality or parameter levels. These signals might be from a current transformer, voltage transformer (or direct reading of voltage), a power sensor, or a signal analyzer that determines THD. A decision step 254 then determines if any one or more of the sensor signals indicates any of these parameters is OOL. If not, the logic simply loops back to step 252 to continue monitoring the sensor signals. However, if any sensor signal indicates that the monitored parameter or power quality condition is OOL, a decision step 256 then determines the parameter(s) or condition(s) that are OOL. The result of this determination is indicated in a step 258. As noted therein, the voltage may be over or under limit, or the THD may be too high, or the current may be too high or too low (or some other predefined or specified parameter may be OOL). Again, these parameters are simply exemplary, since other power related parameters can instead be monitored and controlled in a similar manner.

In a step 260, one or more devices are selected for controlling the condition or modifying the OOL parameter(s). A step 262 then provides for sending a digital control signal to the DCMI functional component, such as the CPU (or to another component controlled by a digital signal), on each selected digitally-controlled device. This step may alternatively be carried out using a different functional control scheme that also enables a device to respond to a digital control signal by modifying the operation of the device so as to increase or decrease its load and/or one or more other parameters or otherwise modify a power-related condition that is OOL (either above a desired level or below the level). In response to the control signal, the selected digitally-controlled device(s) modify their operation to increase or decrease the parameter(s) by predefined increments(s). For example, if the power being consumed is too great on a network switch that is selected for control, the number of ports in use at any given time may be decreased to reduce the power consumed by the switch, by a predefined increment, e.g., by 3%. A step 268 indicates that each such selected digitally-controlled device responds by changing its operation so as to meet the limit and verifies that the change in operation has occurred. A step 270 then waits for a predefined time before returning to step 252, to again receive sensor signal(s) indicating the level of a power usage parameter or quality of power.

Exemplary High Efficiency Power Sources

It must again be emphasized that the present invention is not dependent upon a particular power source being used for the VLSAC or PCRU components of the system discussed above. However, it has been determined that a modification of the AC Link™ power supply normally used as a variable speed motor power supply can serve as a superb power source for a digital load, since it provides high efficiency, low THD, moderate cost, and other benefits, such as adjustability. An exemplary schematic diagram 280 for the modified AC Link™ power source that can replace a conventional switched mode power supply used in many digital devices, such as servers and other digital device, is illustrated in FIG. 10 (FIG. 10 is shown in U.S. Provisional Patent Application 61/437,799 filed Jan. 31, 2011 to which this application claims priority and which is incorporated herein by reference in its entirety). One advantage of this power source is that it can operate on a three-phase 480 VAC input 282 (or on an input voltage up to 4,160 VAC—with proper conductors and protection system) without using any input transformer for initially transforming the voltage of the input power to a lower level, in conformity with the usual and normally expected voltages provided by auto-ranging switched mode power supply systems. The full voltage applied to this power source can be monitored through leads 284, or corresponding lower voltages can be monitored on the output of three resistive voltage dividers on leads 286. A single phase transformer, rectifier, and regulator are used to provide a 24 VDC control voltage on leads 288. The three-phase AC input voltage is coupled to first and second MOSFET transistor bridges 290a and 290b. The output of these two bridges is coupled in series with a high voltage central capacitor 294 and a high frequency transformer primary. The secondary of this transformer is coupled in series with a low voltage central capacitor 296, and to the input to a full wave rectifier. The 48 VDC output of the rectifier is filtered and applied to an output connector 300. Also provided on this connector are 5.0 VDC and 3.5 VDC output voltages that regulated by regulators 298. Further details of this power source are not relevant to the present invention, since the specific design of the power source is not essential to the operation of the system and method disclosed above.

FIG. 11 (FIG. 11 is shown in U.S. Provisional Patent Application 61/437,799 filed Jan. 31, 2011 to which this application claims priority and which is incorporated herein by reference in its entirety) illustrates an exemplary schematic diagram 310 of a larger capacity power source derived from the AC Link™ power source design, as noted above. In this design, three-phase input power at either 480 or 600 VAC (or higher) is provided at an input terminal 312. This AC voltage can be directly monitored on leads 314, or a corresponding lower voltage can be monitored for each phase on leads 316, which are connected to the outputs of resistive voltage dividers. Again, a 24 VDC control voltage on leads 318 is derived from two of the three-phase input lines using a transformer, full wave rectifier, filter, and regulator. These three-phase lines are input to an insulated gate bipolar transistor (IGBT) bridge 324a, and the output of this first bridge is input to a 10 kW transformer 326 through an input central capacitor 328. A secondary winding of the transformer is input through a DC port central capacitor to a DC port IGBT bridge 322 that provides 120 VDC to a connector 320 for use in charging a battery source in an UPS (not shown). When the three-phase input power from a utility or other source that normally energizes the AC Link™ source is interrupted, the battery then provides the power to energize the source.

A main secondary winding of transformer 326 is coupled through an output central capacitor 330 to an output IGBT bridge 324b, which provides three-phase 230 VAC power to an output connector 332. This voltage can be directly monitored, or a corresponding lower voltage can be monitored on leads 334, which are coupled to the outputs of three resistive voltage dividers. Output connector 332 may be coupled to a PCRU or other component of the present system that is designed to be energized with three phase AC voltage.

Total Harmonic Distortion

Harmonic distortion is a measure of the amount of power contained in the harmonics of a fundamental signal. For example, power may be supplied to energize a device at 60 Hz, but the load may generate a substantial third harmonic level at 180 Hz that has most of its harmonic distortion. Harmonic distortion is inherent to devices and systems that possess nonlinear characteristics—the more nonlinear the device, the greater its harmonic distortion. Those of ordinary skill in the art will understand that harmonic distortion can be expressed as a power ratio or as a percentage ratio. For example, the following formula can be used to express harmonic distortion as a power ratio:

$$P_{HD} = P_{fund} - P_{harm} \text{ (dBc)} \tag{1}$$

where $P_{HD}$ is the power of the harmonic distortion in dBc, $P_{fund}$ is the fundamental signal power in dB or dBm, and $P_{harm}$ is the power of the harmonic of interest in dB or dBm. Each of these power values can be converted to voltages to express harmonic distortion as a percentage ratio, as follows:

$$\text{Percentage of Distortion} = \frac{V_{harm}}{V_{fund}} \times 100\%. \tag{2}$$

In some applications, the harmonic distortion is measured as a total harmonic distortion (THD)—as a percentage value. This measurement involves the power summation of all the harmonics in the spectrum band, as defined by the following equation:

$$THD = \frac{\sqrt{V_{h2}^2 + V_{h3}^2 + V_{h4}^2 + \ldots V_{hN}^2}}{V_{fund}} \times 100\%. \tag{3}$$

A typical setup 340 that is conventionally used to perform a harmonic distortion measurement on a device is shown in FIG. 12 (Prior Art—FIG. 12 is shown in U.S. Provisional Patent Application 61/437,799 filed Jan. 31, 2011 to which this application claims priority and which is incorporated herein by reference in its entirety).

A single frequency is generated by a frequency signal generator 342, and this signal is passed through a low pass (or bandpass) filter 344 to suppress any harmonics that may be included in it. The resulting very clean (i.e., purely the fundamental frequency) sinusoidal signal output from the filter is then injected into the input of a unit under test (UUT) 346. Any harmonic content measured by a vector signal analyzer (VSA) 348 at the UUT output can be assumed to be generated by the UUT, instead of the signal source. The preceding approach is applicable to a system with an input and an output suitable for such measurements, such as an audio amplifier. An ideal system can be thought of as having a transfer function that is linear and time-invariant, so that an input signal passes through such an ideal system without distortion being added. In contrast, when a signal passes through a non-ideal, non-linear device, additional distorted content is added to the output signal, and that added content on the output signal has harmonics of the original fundamental frequencies that were input to the device. THD is a measurement of the extent of that distortion, which has the harmonics added to the input signal appearing on the output of the device.

When the input to a device is a pure sine wave, the measurement is most commonly the ratio of the sum of the powers of all higher harmonic frequencies, relative to the power at the first harmonic, or fundamental, frequency:

$$THD = \frac{P_2 + P_3 + P_4 + \ldots + P_\infty}{P_1} = \frac{\sum_{n=2}^{\infty} P_n}{P_1}, \quad (4)$$

which can equivalently be written as:

$$THD = \frac{P_{total} - P_1}{P_1}. \quad (5)$$

Measurements based on amplitudes (e.g., voltage or current) must be converted to power to make addition of the harmonics meaningful, when determining THD. For a voltage signal, for example, the ratio of the squares of the root mean square (RMS) voltages, as shown below, is equivalent to the power ratio:

$$THD = \frac{V_2^2 + V_3^2 + V_4^2 + \ldots + V_\infty^2}{V_1^2} \quad (6)$$

where $V_n$ is the RMS voltage of the nth harmonic and n=1 is the fundamental frequency.

THD is also commonly defined as an amplitude ratio rather than a power ratio, resulting in a definition of THD, which is the square root of the expression given above in Eq. (6), as follows:

$$THD = \frac{\sqrt{V_2^2 + V_3^2 + V_4^2 + \ldots V_n^2}}{V_1}. \quad (7)$$

The definition in Eq. (7) is commonly used in audio distortion (percentage THD) specifications. It is unfortunate that these two conflicting definitions of THD (one as a power ratio and the other as an amplitude ratio) are both in common usage. The power THD can be higher than 100% as it is used in IEEE literature, but for audio measurements, 100% is preferred as maximum, as used in IEC literature. As a result, THD is a non-standardized specification, and the results between manufacturers are not easily comparable. Since individual harmonic amplitudes are measured, it is required that the manufacturer disclose the test signal frequency range, level and gain conditions, and number of measurements taken. It is possible to measure the full or off ordered fundamental frequencies of 20 Hz to 20 kHz range using a sweep frequency input. For all signal processing equipment, except microphone preamplifiers, the preferred gain setting is unity. For microphone preamplifiers, standard practice is to use maximum gain. Measurements for calculating the THD are made at the output of a device under specified conditions. The THD is usually expressed in percent as distortion factor or in dB as distortion attenuation. As used herein, the THD on power input to a facility (or produced by electrical loads in a facility) can be determined using a signal analyzer to measure the level of the harmonics and of the fundamental, as noted above.

The invention claimed is:

1. A power supply and control module (PSCM) configured to provide regulated AC and DC power to a digitally controlled load, the power supply and control module comprising:
   a variable load-sensing adaptive controller (VLSAC) configured to accept an alternating current (AC) input and provide one or more regulated direct current (DC) voltages to the digitally controlled load;
   wherein the VLSAC is configured to provide digital load commands to the digitally controlled load, and wherein the digitally controlled load is configured to change its electrical load characteristics in response to the digital load commands;
   wherein the VLSAC is configured to receive digital load information from the digitally controlled load; and
   wherein the digital load information is used as a control input for control of the digitally controlled load.

2. A power supply and control system comprising:
   one or more power sensors; and
   one or more PSCMs according to claim 1;
   wherein the one or more power sensors are configured to: i) receive an AC utility input from a utility, ii) provide AC to the VLSACs, and iii) monitor one or more parameters of a total load seen by the utility;
   wherein control of the digitally controlled loads is automatically provided by the VLSACs.

3. A power supply and control system comprising:
   one or more power sensors configured to sense input power provided by a utility;
   one or more power conversion and regulation units (PCRUs) disposed to receive AC from the utility;
   one or more PSCMs according to claim 1; and
   one or more power distribution units (PDUs) disposed to receive AC from the PCRUs and provide AC to the VLSACs;
   wherein the one or more power sensors are configured to: i) receive an AC utility input from a utility, and ii) monitor one or more parameters of a total load seen by the utility;
   wherein the PCRUs and the PDUs are configured to provide intermediate-level control of the digitally controlled loads by providing automatic control of connected lower-level controllers.

4. The power supply and control system of claim 3 further comprising:
   a master controller, wherein overall control is provided by the master controller, and wherein a granularity of the overall control by the master controller is provided by controlling the VLSACs, the PDUs and the PCRUs.

5. The power supply and control system of claim 4, further comprising:
   a compensating unit for actively compensating total harmonic distortion, wherein an output of the compensating unit is connected to the AC utility input.

6. The power supply and control system of claim 1, wherein the digitally controlled load is capable of providing any of two or more distinct electrical loads while operating, responsive to the digital load commands.

7. The PSCM of claim 1, wherein the PSCM is configured to provide one or more AC voltages to the digitally controlled load.

* * * * *